No. 647,328. Patented Apr. 10, 1900.
N. B. RIDDLE.
FENCE POST.
(Application filed July 14, 1899.)
(No Model.)
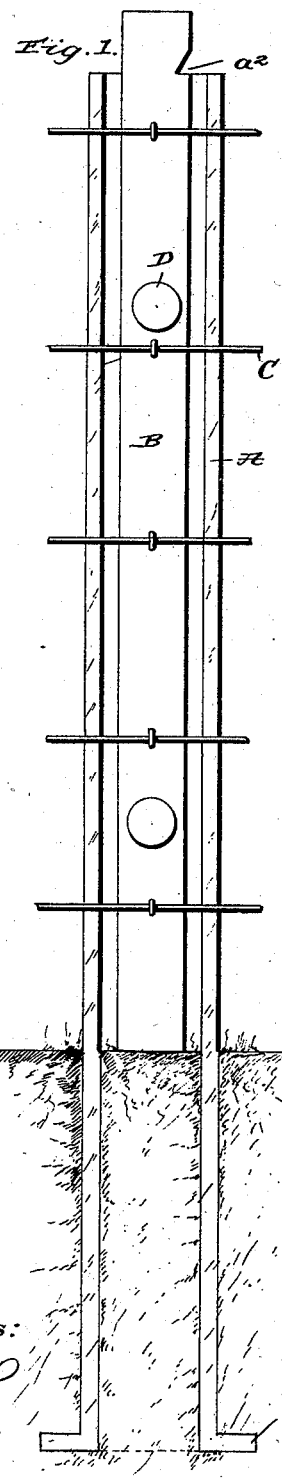
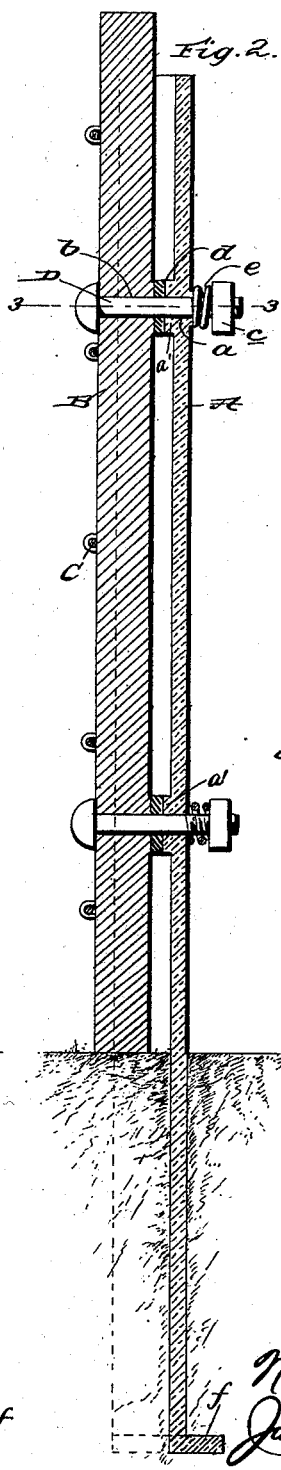
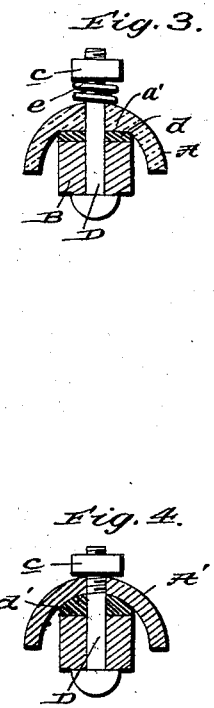
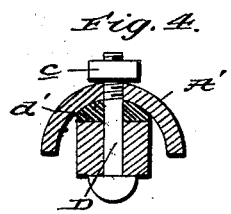
Witnesses:
Inventor
N. B. Riddle
James J. Sheehy
Attorney

UNITED STATES PATENT OFFICE.

NAPOLEON B. RIDDLE, OF ST. FRANCISVILLE, LOUISIANA.

FENCE-POST.

SPECIFICATION forming part of Letters Patent No. 647,328, dated April 10, 1900.

Application filed July 14, 1899. Serial No. 723,823. (No model.)

*To all whom it may concern:*

Be it known that I, NAPOLEON B. RIDDLE, a citizen of the United States, residing at St. Francisville, in the parish of West Feliciana and State of Louisiana, have invented new and useful Improvements in Fence-Posts, of which the following is a specification.

My invention relates to fence-posts; and it consists in the simple, inexpensive, and durable construction hereinafter described, and particularly pointed out in the claims appended.

In the accompanying drawings, Figure 1 is a front elevation of a fence-post embodying my invention. Fig. 2 is a vertical central section of the same. Fig. 3 is a transverse section taken in the plane indicated by line 3 3 of Fig. 2. Fig. 4 is a transverse section illustrating a modification.

Referring by letter to said drawings, and more particularly to Figs. 1 to 3 thereof, A is the main section of my improved fence-post, which is preferably concavo-convex in cross-section and sufficiently long to permit of its lower portion being buried in the ground after the manner shown. This section A is molded or otherwise formed of glass and is provided at intervals of its length with transverse apertures $a$ and portions $a'$ of increased thickness surrounding the same.

B is a section of wood which is designed to rest in the concavity of the section A and above the ground and serve for the connection of runner-wires C.

D shows bolts which have for their purpose to connect the sections A and B. These bolts extend through apertures $b$ in section B and the apertures $a$ in section A and are headed at one end and provided with threads at their opposite ends to receive nuts $c$. They are also provided, as best shown in Figs. 2 and 3, with spacing devices, preferably cushions $d$ of rubber and coiled springs $e$, the former being interposed between the sections A B and the latter between the section A and nuts $c$. The cushions $d$ and springs $e$ serve to yieldingly hold the wood section B in the position shown, so as to afford a space at the back and sides of the said section for the circulation of air, which tends to prevent rotting thereof. Said cushions and springs also serve to prevent the transmission of shock and strain from the runner-wires and wood section B to the fragile section A, and thereby lessen the liability of the latter's being fractured or broken. The cushions and springs, by tending to expand, further serve to prevent casual rotation and displacement of the nuts $c$ and the consequent disconnection of section B from section A.

The section A of glass is extremely cheap and is further advantageous, since it is not liable to be affected by the weather or the moisture in the ground and is therefore calculated to last for an indefinite period of time.

It will be appreciated from the foregoing that the parts of my improved fence-post may be readily assembled and connected together and that the said post may be set in the ground quite as quickly and easily as the ordinary fence-post.

I have shown the section A as provided with a base-flange $f$, but do not desire to be understood as confining myself to the same, as experience has demonstrated that it is not necessary to provide every post of a fence with such a flange.

In Fig. 4 I have shown a modified post which is similar to that shown in Figs. 1 and 3, with the exception that its section A' is formed of wrought or cast iron, the springs $e$ are omitted, and the spacing device $d'$ may be of any suitable material.

When formed of wrought-iron, the sections A' may be made very rapidly and cheaply.

In both embodiments of the invention the wood section is preferably extended above the main section and provided with a notch $a^2$. This notch is designed for the engagement of a brace, (not shown,) which is employed in conjunction with about every tenth post for the purpose of tightening the runner-wires.

Having thus described my invention, what I claim is—

1. A fence-post comprising a section adapted to be sunk in the ground and having a concavity in one of its sides, a section of wood arranged in the concavity of said section, bolts extending through the sections and having threaded ends, nuts mounted on the threaded ends of the bolts, and cushions of rubber mounted on the bolts and interposed between the sections, substantially as specified.

2. A fence-post comprising a section of glass adapted to be sunk in the ground and having a concavity in one of its sides, a section of wood arranged in the concavity of said section and adapted to rest above the ground, bolts extending through the sections and having threaded ends, nuts mounted on the threaded ends of the bolts, cushions of rubber mounted on the bolts and interposed between the sections, and springs mounted on the bolts and interposed between the glass section and the nuts, substantially as specified.

3. A fence-post comprising a section of glass adapted to be sunk in the ground and having a concavity in one of its sides, and also having transverse apertures and portions of increased thickness surrounding said apertures at its inner side, a section of wood arranged in the concavity of said section and adapted to rest above the ground, bolts extending through the sections and having threaded ends, nuts mounted on the threaded ends of the bolts, cushions of rubber mounted on the bolts and interposed between the sections, and springs mounted on the bolts and interposed between the glass section and the nuts, substantially as specified.

In testimony whereof I have hereunto set my hand in presence of subscribing witnesses.

NAPOLEON B. RIDDLE.

Witnesses:
W. C. LAURASON,
W. M. PERCY.